Patented May 14, 1935

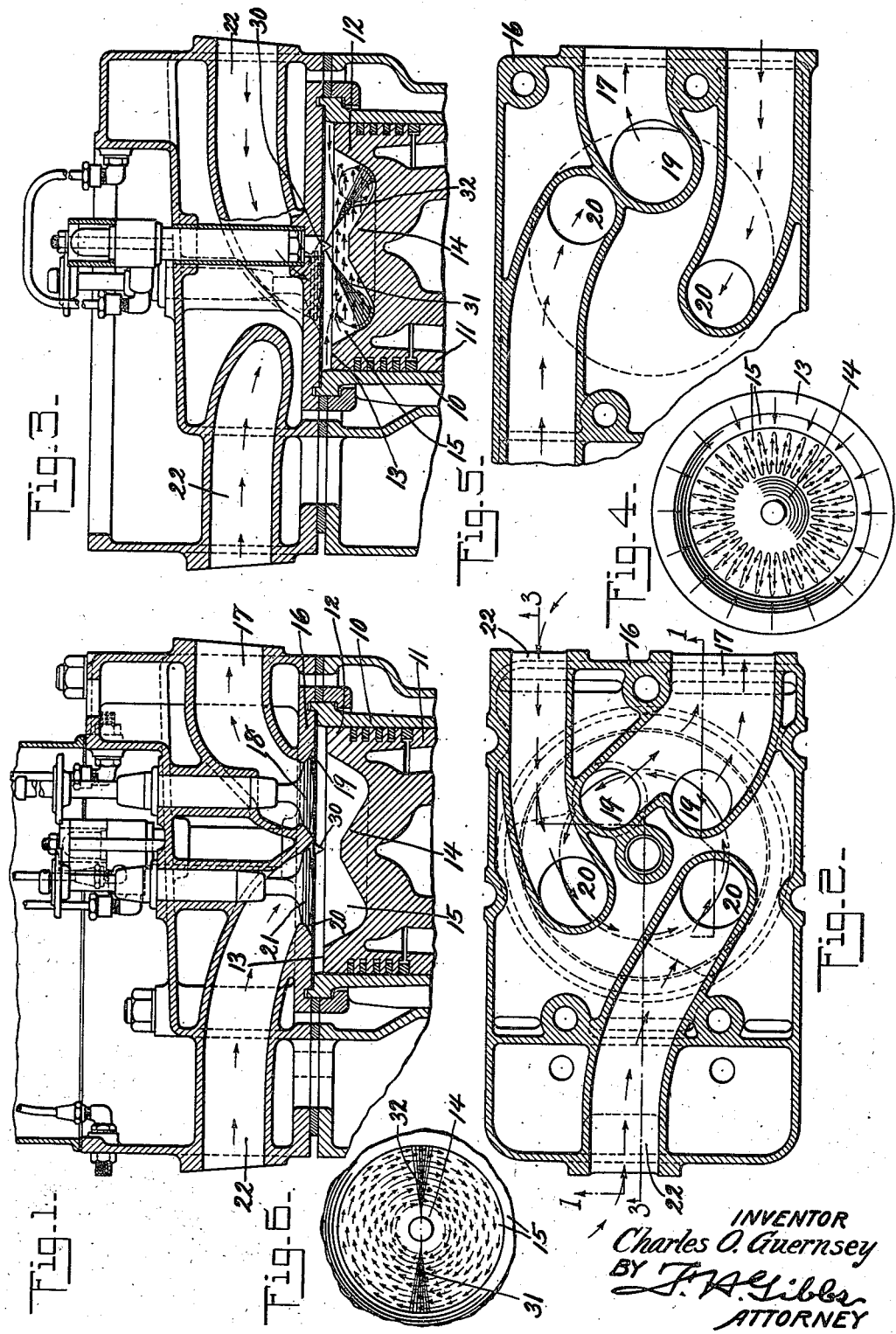

2,001,358

UNITED STATES PATENT OFFICE 2,001,358

INTERNAL COMBUSTION ENGINE

Charles O. Guernsey, Yeadon, Pa., assignor to American Car and Foundry Motors Company, New York, N. Y., a corporation of Delaware Application December 2, 1931, Serial No. 578,501

2 Claims. (Cl. 123—32)

This invention relates to internal combustion engines and with regard to certain more specific features thereof to internal combustion engines of the high compression type. Still more particularly it relates to the air intake and combustion chambers of such engines and to a method of introducing and admixing air and liquid fuel.

The invention has for one of its objects to obtain an even and extremely thorough distribution of the liquid fuel in air which has been brought to a state of high compression at or prior to the time of the introduction of the liquid fuel.

It is known to be old in the art to provide devices for the purpose of agitating the air in a cylinder or combustion chamber with a view to obtaining a diffusion of the liquid fuel. However, in engines of the high compression type the period, within which the fuel must be introduced and mingled with the compressed air, is so short, and the working space for valves or other mechanical contrivances is so limited that difficult problems have arisen which the present invention has solved in a simple, inexpensive and highly efficient manner. Devices have been developed for increasing the air velocity at a single intake point and so-called shrouded valves have been proposed to give the air predetermined direction on its entry into the cylinder. These are unsatisfactory in that either they fail to provide the necessary force or turbulence to the air current to cause it to persist over the neutralizing action of the compression stroke and contact all the air with liquid fuel, or because they require additional sleeves or parts adding materially to the expense and detracting from the efficiency and durability of the engine. The use of shrouded valves or venturi creates a resistance which prevents a satisfactory filling of the chamber with air. This has been difficult to overcome as increase of the valve size is limited by the bore size of the engine. It is an object of the present invention to provide simple and reliably operative means which shall afford satisfactory filling and cause the air turbulence and high velocity in a predetermined direction to persist at the end of the compression stroke of the piston long after the air intake valves have been closed.

It is a further object of the invention to so construct and co-ordinate the piston, cylinder head and cylinder, or those parts of same which enter into the formation of the combustion chamber, that an effect of increased or continued turbulence is obtained by air displacement during the compression stroke and after the air intake means has ceased to function.

Fuel injection starts in a four stroke cycle engine ordinarily between 20 and 40 degrees prior to the piston reaching dead center on its compression travel. It is a still further object of the present invention to insure ample air turbulence throughout the fuel injection operation, and to insure not only that all the fuel injected shall be finely divided and mixed with compressed air, but that all the air under compression shall have dispersed therein a suitable and substantially proportionate amount of fuel. To this end it is provided that the rotational velocity of the air shall persist during the fuel injection at a rate presenting all of the air in the combustion chamber to the one or more sprays of the injection nozzle. Completeness of fuel dispersion through the air column may be obtained according to the present invention by using comparatively few spray-jets and without exceptionally high fuel pressure. Many of the prior proposals require a large number of spray holes of very small size making the spray nozzle a difficult piece to manufacture and very susceptible to clogging in operation.

Other objects will be in part obvious and in part pointed out particularly hereinafter.

The invention accordingly consists in the various features of construction, combinations of elements and arrangements of parts which will be exemplified by the construction hereinafter set forth and the scope of the application of which will be indicated in the appended claims.

In the accompanying drawing wherein is represented two of various possible embodiments of the invention.

Figure 1 is a fragmentary view in vertical cross section through a cylinder, cylinder head and piston embodying the invention. The section is taken substantially on the line 1—1 of Fig. 2;

Fig. 2 is a view in horizontal cross section taken through the air inlet and outlet passages of the cylinder head;

Fig. 3 is a view in cross section taken substantially on the line 3—3 of Fig. 2;

Fig. 4 is a view representing the air conditions in the combustion chamber as the piston proceeds toward the end of its compression stroke;

Fig. 5 is a view similar to Fig. 2 but showing a modified arrangement of inlet and outlet ports;

Fig. 6 is a view illustrating the air conditions in the combustion chamber at the time of introducing the liquid fuel.

Referring to the drawing more in detail a cylinder 10 has arranged therein a piston 11 preferably constructed with a specially shaped head 12 comprising an outer extending ring 13 adjacent the inner cylinder wall and a frusto-conical central portion 14. The ring and central portion define a circular recess 15 of sectional shape shown clearly in Figs. 1 and 3 of the drawing.

The cylinder 10 is fitted with a cast cylinder head 16 formed with an exhaust passage 17 normally closed by exhaust valves 18 seated in outlet apertures 19 respectively communicating with the passage 17 and with the cylinder 10. The cylinder head is also provided with inlet apertures 20 preferably spaced on opposite sides of the cylinder as shown either in Fig. 2 or 5 of the drawing. These inlet apertures are fitted with intake valves 21 normally closing extended passages or conduits 22 from the cylinder 10. The passages or conduits 22 are purposely designed of substantial length and arranged on opposite sides of the cylinder axis so as to induce an air current of particular direction when the valves 21 are opened and the pressure is lowered in the cylinder by the suction stroke of the piston 11. The passages 22 are preferably arranged substantially tangential of a cross section of the cylinder so that the induced air current will be substantially parallel to the inner circumference of the cylinder to the end that it will follow the inner wall of the cylinder during the suction and compression strokes of the piston.

By the construction described, air in large volume and at high velocity enters through passage 22 and ports 20 on opposite sides of the cylinder head following the piston in its suction stroke and filling the cylinder 10 with air swirling at a high rate around the cylinder axis. On the compression stroke this swirling air is compressed substantially into the space provided in the top of the piston head by the extended head wall 13 and the frusto-conical central portion 14. Although the action of the piston in compressing the air may have some dampening effect on the rotational velocity of the air it is not sufficient to neutralize it, with the result that as the piston nears the end of its compression stroke a column of compressed air having a high rate of rotational velocity exists within the space at the head of the piston and between the piston and cylinder head. It appears that air displaced from the inner cylinder wall by the ring 13 of the advancing piston adds materially to the swirling and turbulent condition of the air column in the piston head so that the column in addition to a movement around the axis of the piston has some rotative movement transversely as indicated by one set of arrows in Fig. 3 of the drawing. Following this idea strictly each atom would be advancing in the combustion chamber in spiral fashion proceeding circumferentially around the chamber and at the same time traveling in a transverse orbit. It is, of course, impossible to obtain an exact representation of the air movement but it has been definitely determined by tests and observations that the rotary swirl induced during the suction stroke persists throughout the fuel injection stroke with satisfactory turbulence and high velocity to obtain complete co-mingling of the air and fuel and consequent complete combustion. The air displaced inwardly from the cylinder walls by advancing the piston appears to impinge upon the rotating air in the chamber in the piston head with the general result that a compressed air column is rotating about a vertical axis which is the center line of the cylinder and about a horizontal axis which is the circular center line of the column.

The fuel supply means may be of an air injection type but in the form preferred is a well known mechanical injector by which the oil is introduced to the combustion chamber periodically by pump and in the form of a coarse spray or sprays, given direction by the shape of holes in the injector nozzle. The nozzle is indicated in the drawing at 30 as having two diametrically opposed spray holes each having an angle with the nozzle wall which delivers the oil spray substantially parallel with the side wall of the frusto-conical section 14 of the piston head and outwardly transversely of the path of swirling air. In other words the spray is directed to the annular cavity in the piston head where the air turbulence is apparently at maximum. The invention is not limited to any particular number of jets or sprays. It is desirable, however, to have the sprays in such number and position that the entire column of air will be contacted in its swirl, with oil from one or more spray holes. With the present form of air intake and compression two jets 31 and 32 arranged diametrically opposite have been found ample.

The oil injection operation is commenced preferably shortly before the piston reaches the end of its compression stroke and may continue somewhat beyond the top dead center of the piston. It has been determined that the arrangement described can, if desired, produce a rate of air swirl as high as eight times the speed of rotation of the engine. By way of illustration therefore, an engine speed of 1000 R. P. M. causes an air swirl at the rate of 8000 R. P. M. If the duration of the injector operation is 36 degrees of crank travel or $\frac{1}{10}$th of a revolution, the air would make $\frac{8}{10}$ths of a complete revolution in the combustion chamber during the time the fuel is being injected. If two sprays 180 degrees apart are located around the axis of the cylinder the compressed and consequently heated air, traveling 288 degrees during the injection operation, is all presented to the oil spray. This, in addition to finely dividing and vaporizing the fuel, insures that all of the air in the column is entirely charged with the fuel. It will be obvious to one skilled in the art that the overlap may be cut down by varying the valve opening, regulating the duration of the injection operation or in various other ways, if desired.

By the above described construction there is such intimate mixing of the fuel particles with the entire body of compressed air that combustion is substantially complete. The engine has high thermal efficiency, is quiet in operation and has an exhaust which is hardly visible under normal conditions. By reason of the form of air intake provided, a persisting high velocity swirl of air is present in the combustion chamber when the liquid fuel is supplied. This, in combination with the proper number of correctly arranged and directed fuel sprays, produces such a complete and well-organized fuel charge that the engine may be very closely regulated in fuel supply for varying loads. As a consequence a great saving in fuel is effected.

What is claimed is:

1. In an internal combustion engine of the Diesel type, the combination of a piston the head of which is formed with an annular cavity to accomodate a fuel ring, the cavity being defined internally by a central cone, the outer wall of the cavity being inclined to terminate short of the cylinder wall whereby a ring-like shelf is provided at the edge of the piston to cause preliminary accelerated pressure inwardly across the annular cavity upon upward movement of the piston whereby rotation of the mass in the annular cavity towards a common axis is produced, a plurality of inlets arranged to direct air tangentially at spaced points to cause rotation of the mass in said fuel ring about a common axis, and a fuel inlet positioned over the cone-shaped piston extension having ports arranged to direct oil into the annular cavity and transversely of the fuel ring towards its inclined outer wall.

2. In an internal combustion engine of the Diesel type, the combination of a piston the head of which is formed with an annular cavity, the outer wall of the cavity being inclined and terminating short of the cylinder wall to provide an annular shelf at the edge of the piston head whereby pressure is directed inwardly tangentially of the annular cavity to produce a rotation of the mass within the cavity towards a common axis, a plurality of air inlets positioned to direct air tangentially at spaced points whereby the rotating mass within the annular cavity is caused to spiral therein about a common axis, and a fuel inlet positioned centrally of the annular cavity and formed with an opening for directing fuel into the spirally rotated mass within the annular cavity, the fuel penetrating the spirally rotating mass in a path approximating the path of travel of the mass as the piston approaches the dead center position whereby the fuel and air are spirally distributed in the annular cavity.

CHARLES O. GUERNSEY.